United States Patent [19]
Zimmerman et al.

[11] Patent Number: 5,236,733
[45] Date of Patent: Aug. 17, 1993

[54] LOW MOISTURE FAT-CONTAINING FOODS SUCH AS POTATO CHIPS HAVING LESS WAXINESS AND IMPROVED FLAVOR DISPLAY

[75] Inventors: Stephen P. Zimmerman, Wyoming; Jerry D. Young, Cincinnati, both of Ohio

[73] Assignee: The Procter & Gamble Company, Cincinnati, Ohio

[21] Appl. No.: 8,236

[22] Filed: Jan. 21, 1993

Related U.S. Application Data

[63] Continuation of Ser. No. 514,795, Apr. 26, 1990, abandoned.

[51] Int. Cl.$^5$ ............................................. A23D 9/00
[52] U.S. Cl. ................................. 426/611; 426/606; 426/607; 426/804
[58] Field of Search ............... 426/601, 606, 607, 438, 426/804

[56] References Cited

U.S. PATENT DOCUMENTS

| | | | |
|---|---|---|---|
| 3,600,186 | 8/1971 | Mattson et al. | 426/611 |
| 4,005,195 | 1/1977 | Jandacek | 424/180 |
| 4,005,196 | 1/1977 | Jandacek et al. | 424/180 |
| 4,034,083 | 7/1977 | Mattson . | |
| 4,797,300 | 1/1989 | Jandacek et al. . | |
| 4,940,601 | 7/1990 | Orphanos et al. | 426/601 |
| 5,085,884 | 2/1992 | Young | 426/611 |

FOREIGN PATENT DOCUMENTS

| | | |
|---|---|---|
| 0233856 | 8/1987 | European Pat. Off. . |
| 236288 | 9/1987 | European Pat. Off. . |
| 287157 | 10/1988 | European Pat. Off. . |
| 290065 | 11/1988 | European Pat. Off. . |
| 290420 | 11/1988 | European Pat. Off. . |
| 311154 | 4/1989 | European Pat. Off. . |

*Primary Examiner*—Carolyn Paden
*Attorney, Agent, or Firm*—Ronald L. Hemingway; George W. Allen; Eric W. Guttag

[57] ABSTRACT

Reduced calorie, low moisture fat-containing foods such as potato chips having less waxiness and improved flavor display are disclosed. These benefits are typically obtained by applying to the surface of the potato chip, or other food, fat compositions having certain thixotropic areas that correlate to reduced waxiness impressions. These fat compositions comprise a nondigestible fat component, and optionally a digestible triglyceride fat or oil. The nondigestible fat component comprises a nondigestible oil and certain solid polyol fatty acid polyesters having ester groups consisting essentially of long chain ($C_{14}$ or higher) saturated fatty acid radicals that bind such liquid oils and thus control or prevent passive oil loss.

21 Claims, No Drawings

LOW MOISTURE FAT-CONTAINING FOODS SUCH AS POTATO CHIPS HAVING LESS WAXINESS AND IMPROVED FLAVOR DISPLAY

This is a continuation of application Ser. No. 07/514,795, filed on Apr. 26, 1990, now abandoned.

TECHNICAL FIELD

This application relates to reduced calorie, low moisture fat-containing foods, in particular potato chips, having less waxiness and improved flavor display. This application further relates to fat compositions useful in preparing such potato chips and other low moisture fat-containing foods.

Salted snacks such as potato chips, corn chips and tortilla chips are particularly popular consumer snack products. In the case of potato chips, whole potatoes are cut up into potato slices, or else are mashed, dried to provide potato flakes or granules, reconstituted to form a sheet of potato dough, and then pieces are fabricated from the potato dough sheet. These potato slices or fabricated potato pieces are then immersed in a frying fat or oil medium that has been heated to temperatures of approximately 300° to 400° F. (148.9° to 204.4° C.).

The potato slices or fabricated potato pieces can be immersed in this hot frying medium for varying lengths of time, typically on the order of about 10 seconds to about 3 minutes, 30 seconds. While immersed, the slices or pieces absorb a substantial quantity of the frying fat or oil, typically on the order of from about 25 to about 50% by weight of the resulting potato chip. Typically, this frying medium comprises soybean oil, cottonseed oil or peanut oil. Accordingly, since this frying fat or oil comprises almost exclusively triglycerides, this imparts a significant caloric content (about 9 calories per gram of oil absorbed) to the potato slices or fabricated potato pieces, as well as other foods fried in such mediums.

Certain polyol fatty acid polyesters have been suggested as low calorie substitutes for these triglyceride fats and oils. For example, U.S. Pat. No. 3,600,186 to Mattson et al, issued Aug. 17, 1971, discloses low calorie food compositions in which at least a portion of the fat content of a fat-containing food is provided by a nonabsorbable, nondigestible sugar fatty acid ester or sugar alcohol fatty acid ester having at least 4 fatty acid ester groups with each fatty acid having from 8 to 22 carbon atoms. Foods in which these polyol polyesters are particularly useful as partial or complete replacements for triglyceride fats or oils include products suitable for use in frying. Unfortunately, regular ingestion of moderate to high levels of completely liquid forms of these polyol polyesters can produce undesirable passive oil loss, namely, leakage of the polyesters through the anal sphincter. By contrast, completely solid versions of these polyesters provide a sufficiently high solids content at mouth temperatures (e.g., 92° F., 33.3° C.) such that they taste waxy in the mouth when ingested.

As an alternative to these completely liquid or completely solid nondigestible/nonabsorbable polyol polyesters, certain intermediate melting polyol fatty acid polyesters have been developed that provide passive oil loss control, while at the same time reducing waxiness in the mouth. See European patent application 236,288 to Bernhardt, published Sep. 9, 1987 and European patent application 233,856 to Bernhardt, published Aug. 26, 1987. These intermediate melting polyol polyesters exhibit a unique rheology at body temperatures due to a matrix involving a minimal level of solids (e.g. about 12% or lower) that bind the remaining liquid portion. As a result, these intermediate melting polyol polyesters are sufficiently viscous and have a sufficiently high liquid/solid stability at body temperatures to control passive oil loss. An example of such intermediate melting polyol polyesters are those obtained by substantially completely esterifying sucrose with a 55:45 mixture of fully hydrogenated (hardstock) and partially hydrogenated soybean oil fatty acid methyl esters. See Examples 1 and 2 of the above European patent applications.

The above European applications disclose these intermediate melting polyol polyesters to be useful as total or partial replacements for other fats and oils in various food products, including cooking and frying oils. However, it has been found that potato chips that are fried in frying fats containing substantial levels of these intermediate melting polyol polyesters, particularly at levels in excess of about 40%, have significantly increased waxiness impressions compared to potato chips that have been fried in the triglyceride fat or oil that has been replaced. (In terms of physical properties, "waxiness" relates to how the fat composition is sensed in the mouth.) Indeed, this increased waxiness impression with regard to these intermediate melting polyol polyesters is recognized by European patent application 233,856 in that digestible food materials, such as triglycerides and substituted mono- and diglycerides, that act as solvents for these intermediate melting polyol polyesters are included in the fat composition. However, as the proportion of triglycerides is increased relative to the intermediate melting polyol polyesters to impart less waxiness to the potato chips, the caloric content of the frying fat also increases accordingly. In addition, it has been found that frying fats containing greater than about 40% of these intermediate melting polyol polyesters can adversely affect the flavor display of the resulting fried potato chips.

Accordingly, it would be desirable to be able to obtain reduced calorie potato chips and other fried, or fat-containing, foods having less waxiness and substantially unaltered flavor display.

BACKGROUND ART

U.S. Pat. No. 4,005,195, to Jandacek, issued Jan. 25, 1977, discloses liquid polyol fatty acid polyesters and anti-anal leakage agents (e.g., solid polyol fatty acid polyesters such as sucrose octastearate) used for the treatment of hypercholesterolemia. The anti-anal leakage agents can be included in amounts of at least about 10% by weight (e.g., from about 20 to about 50% by weight) of the liquid polyol polyester. In Example IV, a cooking fat is disclosed made with 50% liquid sucrose polyester and 50% cocoa butter; the sucrose polyester has an average 7.5 oleic acid ester groups per molecule of sucrose. See also Example V (plastic shortening suitable for frying that contains 50% liquid xylitol pentaoleate).

U.S. Pat. No. 4,005,196 to Jandacek, issued Jan. 25, 1977, also discloses combinations of liquid polyol polyesters, anti-anal leakage agents, plus fat-soluble vitamins. Example VI discloses a cooking fat made with 70% sucrose octaoleate and 30% sucrose octastearate.

European patent application 311,154 to Letton, published Apr. 12, 1989. discloses fatty acid esters of sucrose where the fatty acid groups consist essentially of short chain fatty acid radicals having from 2 to 10 carbon atoms and long chain fatty acid radicals having from 20 to 24 carbon atoms in a molar ratio of short chain:long chain radicals of 5:3 to 3:5 with the degree of esterification being about 7 to 8. These solid sucrose polyester compounds are disclosed as having the ability to trap large amounts of liquid (e.g., nondigestible) oils when blended in relatively small amounts (on the order of from about 10 to 20%) with the liquid oils to convert them to solid compositions at temperatures below about 40° C. These solid sucrose polyesters are also disclosed as being particularly useful in preventing the anal leakage problem associated with the ingestion of liquid nondigestible oils. See page 3. Blends of these solid sucrose polyesters with liquid nondigestible oils can be used in baked farinaceous snack foods, and other baked salted snacks. See page 4, lines 4-5. In addition, shortening and oil products based on these blends can be used as cooking and frying oils. See page 4, lines 9-10. See also U.S. Pat. No. 4,797,300 to Jandacek et al, issued Jan. 10, 1989, which discloses plastic shortenings based on these blends of liquid nondigestible oils and 10-25% solid sucrose polyesters having mixed short chain/long chain saturated fatty acids, and their use in baked farinaceous snack foods, other baked salted snacks and cooking and frying oils.

European patent application 287,157 to Baginski et al. published Oct. 19, 1988, discloses frying mediums which comprise from about 35 to 100% sugar polyesters (e.g., intermediate melting sucrose polyester) having at least 70% octaester content and from 0 to about 65% other frying medium ingredients (e.g., glyceride oils). These frying mediums are used in the preparation of various fat-containing foods, including potato chips. Example 3 discloses two frying mediums containing 100% sucrose polyesters (12% or 30% solids at body temperature) that were used to fry fabricated (i.e., Pringles-style) potato chips. See also European patent application 290,420 to Guffey et al, published Nov. 9, 1988 (shortening products made with intermediate melting polyol polyesters, as well as food compositions having enhanced flavors due to the addition of these intermediate melting polyol polyester-containing shortenings, useful in fried foods such as Pringles, potato chips, corn chips, and tortilla chips); European patent application 290,065 to Guffey et al, published Nov. 8, 1988 (food or beverage compositions having altered flavor display which contain polar or intermediate polarity flavor compounds, as well as a fat phase containing intermediate melting polyol polyesters, useful in fried foods such as Pringles, potato chips, corn chips and tortilla chips).

European patent application 236,288 to Bernhardt, published Sep. 9, 1987, discloses intermediate melting polyol polyesters as partial or complete replacements for other fats or oils. Amongst the various uses disclosed for these intermediate melting polyol polyesters are cooking and frying oils. See page 14. See also European patent application 233,856 to Bernhardt, published Aug. 26, 1987, which discloses combinations of these intermediate melting polyol polyesters with digestible food materials (e.g., triglycerides) which act as a solvent that can be used in cooking and frying oils.

DISCLOSURE OF THE INVENTION

The present invention relates to reduced calorie potato chips and other low moisture fat-containing foods having less waxiness and improved flavor display. These benefits are typically obtained by applying to the surface of the food a fat composition having a thixotropic area of about 200,000 pascals/second or less, and which comprises:

A. from about 10 to 100% of a nondigestible fat component having a Solid Fat Content (SFC) profile slope between 98.6° F. (37° C.) and 70° F. (21.1° C.) of from 0 to about −0.3. and comprising:
  (1) from about 60 to about 90% of a liquid nondigestible oil having a complete melting point below about 37° C.; and
  (2) from about 10 to about 40% solid polyol fatty acid polyesters having a complete melting point above about 37° C., wherein the polyol has at least 4 hydroxyl groups, wherein the ester groups consist essentially of $C_{14}$ or higher saturated fatty acid radicals, and wherein at least 4 of the hydroxyl groups are esterified; and B. from 0 to about 90% of a digestible triglyceride fat or oil.

The above-defined solid polyol fatty acid polyesters are capable of binding the liquid digestible oils, and thus controlling or preventing passive oil loss associated with the ingestion of such liquid oils. In addition, it has also been surprisingly found that the above-defined maximum thixotropic area correlates to a reduced waxiness impression for potato chips and other low moisture foods containing these fat compositions. These waxiness/flavor display improvements for the fat compositions of the present invention are believed to be due to the fact that these compositions containing the above-defined solid polyol polyesters flow more readily when subjected to shear (i.e. mastication) and are more readily dispersed in saliva.

A. Definitions

By "nondigestible fat or oil" is meant that only about 70% or less of the fat or oil is digested by the body. Preferably, only about 20% or less of such fats or oils are digested.

By "digestible triglyceride fat or oil" is meant a triglyceride fat or oil that is substantially completely digested by the body. Typically, at least about 90% of such triglyceride fats or oils are digested.

As used herein, the term "comprising" means various components can be conjointly employed in the fat compositions of the present invention. Accordingly, the term "comprising" encompasses the more restrictive terms "consisting essentially of" and "consisting of".

All percentages and proportions used herein are by weight unless otherwise specified.

B. Fat Compositions

The fat compositions of the present invention are particularly characterized by a maximum thixotropic area. As used herein, the term "thixotropic area" refers to a rheological measurement of the fat composition that determines the energy per unit volume required to breakdown the physical structure of the fat under specific shear conditions. It has been surprisingly found that the thixotropic area of fat compositions of the present invention is correlatable to the waxiness impression for potato chips and other low moisture foods containing these compositions, as determined by organoleptic testing. In particular, a lower thixotropic area for the fat composition generally correlates to a reduced waxiness impression for potato chips and other low moisture foods containing these fat compositions.

The maximum thixotropic area of the fat compositions of the present invention that is suitable in providing reduced waxiness impressions can vary somewhat depending on the food involved, and especially the fat content of the food. In the case of "high fat" foods (i.e., fat content of from about 33 to about 50%), the thixotropic area of the fat composition can be about 100,000 pascals/second (Pa/S) or less, preferably about 60,000 Pa/S or less, and most preferably about 20,000 Pa/S or less. In the case of "medium fat" foods (i.e., fat content of from about 22 to about 33%), the thixotropic area of the fat compositions of the present invention can be about 150,000 Pa/S or less, preferably about 100,000 Pa/S or less and most preferably about 60,000 Pa/S or less. In the case of "low fat" foods (i.e., fat content of from about 10 to about 22%), the thixotropic area can be about 200,000 Pa/S or less, preferably about 150,000 Pa/S or less, and most preferably about 100,000 Pa/S or less. In general, the thixotropic area of the fat composition can be increased as the fat content decreases and still provide reduced waxiness impressions in the potato chip or other low moisture fat-containing food.

A key ingredient of the fat compositions of the present invention is a nondigestible fat component. This non-digestible fat component comprises from about 10 to 100% of the composition. Preferably, this nondigestible fat component comprises from about 40 to about 100%, and most preferably from about 40 to about 70%, of the composition. Inclusion of higher levels of this nondigestible fat component is particularly desirable in terms of reducing the caloric value of the potato chip or other low moisture food containing these compositions.

This nondigestible fat component comprises a liquid nondigestible oil having a complete melting point below about 37° C., as well as certain solid polyol fatty acid polyesters having a complete melting point above about 37° C. Generally, this nondigestible fat component comprises from about 60 to about 90% of the liquid nondigestible oil, and from about 10 to about 40% of the solid polyol polyesters. Preferably, this nondigestible fat component comprises from about 70 to about 90% liquid nondigestible oil and from about 10 to about 30% solid polyol polyesters, and most preferably from about 75 to about 85% liquid nondigestible oil and from about 15 to about 25% solid polyol polyesters. Inclusion of higher levels of liquid nondigestible oil (i.e. lower levels of solid polyol polyesters) can be desirable from the standpoint of reducing waxiness in the potato chips or other low moisture food containing the fat composition. However, higher levels of solid polyol polyesters (i.e. lower levels of liquid nondigestible oil) are desirable from the standpoint of controlling or preventing passive oil loss associated with the ingestion of such liquid nondigestible oils.

The nondigestible fat component is further characterized by a relatively flat Solid Fat Content (SFC) profile slope across the temperature range of from typical room temperature to body temperature, i.e. from 70° F. (21.1° C.) to 98.6° F. (37° C.). The SFC profile slope between these temperatures is from 0 to about −0.3. Preferably, the slope of the SFC profile will be from 0 to about −0.1.

Suitable liquid nondigestible edible oils for use herein include liquid polyol fatty acid polyesters (see U.S. Pat. No. 4,005,195 to Jandacek, issued Jan. 25, 1977); liquid esters of tricarballylic acids (see U.S. Pat. No. 4,508,746 to Hamm, issued Apr. 2, 1985); liquid diesters of dicarboxylic acids such as derivatives of malonic and succinic acid (see U.S. Pat. No. 4,582,927 to Fulcher, issued Apr. 15, 1986); liquid triglycerides of alpha-branched chain carboxylic acids (see U.S. Pat. No. 3,579,548 to Whyte, issued May 18, 1971); liquid ethers and ether esters containing the neopentyl moiety (see U.S. Pat. No. 2,962,419 to Minich, issued Nov. 29, 1960); liquid fatty polyethers of polyglycerol (See U.S. Pat. No. 3,932,532 to Hunter et al, issued Jan. 13, 1976); liquid alkyl glycoside fatty acid polyesters (see U.S. Pat. No. 4,840,815 to Meyer et al, issued Jun. 20, 1989); liquid polyesters of two ether linked hydroxypolycarboxylic acids (e.g., citric or isocitric acid) (see U.S. Pat. No. 4,888,195 to Huhn et al, issued Dec. 19, 1988); liquid esters of epoxide-extended polyols (see U.S. Pat. No. 4,861,613 to White et al, issued Aug. 29, 1989); all of which are incorporated herein by reference, as well as liquid polydimethyl siloxanes (e.g., Fluid Silicones available from Dow Corning).

Preferred liquid nondigestible oils are the liquid polyol fatty acid polyesters that comprise liquid sugar fatty acid polyesters, liquid sugar alcohol fatty acid polyesters, and mixtures thereof, the sugars and sugar alcohols containing 4 to 11 hydroxyl groups (preferably from 4 to 8 hydroxyl groups) prior to esterification. With regard to the liquid polyol polyesters, the term "sugar" includes monosaccharides, disaccharides and trisaccharides. The term "sugar alcohol" refers to the reduction product of sugars wherein the aldehyde or ketone group has been reduced to an alcohol. The liquid polyol fatty acid polyesters are prepared by reacting a monosaccharide, disaccharide, trisaccharide or sugar alcohol thereof with fatty acids, as discussed below.

Examples of suitable monosaccharides are those containing 4 hydroxyl groups such as xylose, arabinose and ribose; the sugar alcohol derived from xylose, i.e., xylitol, is also suitable. The monosaccharide erythrose is not suitable for the practice of the present invention since it only contains 3 hydroxyl groups; however, the sugar alcohol derived from erythrose, i.e., erythritol, contains 4 hydroxyl groups and is thus suitable. Among 5 hydroxyl-containing monosaccharides that are suitable for use herein are glucose, mannose, galactose, and fructose. A sugar alcohol derived from glucose, i.e., sorbitol, contains 6 hydroxyl groups and is also suitable as the polyol moiety of the polyesters. Examples of suitable disaccharides are maltose, lactose, and sucrose, all of which contain 8 hydroxyl groups. Examples of suitable trisaccharides include raffinose and maltotriose, both of which contain 11 hydroxyl groups. Preferred polyols for preparing the liquid polyesters for use in the present invention are selected from erythritol, xylitol, sorbitol, glucose and sucrose. Sucrose is especially preferred.

The liquid polyol fatty acid polyesters useful in the present invention must contain at least 4 fatty acid ester groups. Polyol fatty acid polyester compounds that contain 3 or less fatty acid ester groups are digested in and the products of digestion are absorbed from the intestinal tract much in the manner of ordinary triglyceride fats, whereas the polyol fatty acid polyester compounds that contain 4 or more fatty acid ester groups are substantially nondigestible and consequently nonabsorbable by the human body. It is not necessary that all of the hydroxyl groups of the polyol be esterified with fatty acids, but it is preferable that the disaccharide polyols contain no more than 3 unesterified hydroxyl groups, and more preferable that they contain no more than 2 unesterified hydroxyl groups. Most preferably, substantially all of the hydroxyl groups of the disaccharide polyols are esterified with fatty acids, e.g., the liquid sucrose polyesters have from about 7 to 8 hydroxyl groups esterified.

The sugar or sugar alcohol starting materials of these liquid polyol polyesters are esterified with fatty acids containing from 2 to 24 carbon atoms, preferably from 8 to 22 carbon atoms, and most preferably from 12 to 18 carbon atoms. Examples of such fatty acids include acetic, butyric, caproic, caprylic, capric, lauric, myristic, myristoleic, palmitic, palmitoleic, stearic, oleic, elaidic, ricinoleic, linoleic, linolenic, eleostearic, arachidonic, behenic, and erucic acid. The fatty acids can be derived from naturally occurring or synthetic fatty acids. Suitable sources of naturally occurring fatty acids include corn oil fatty acids, cottonseed oil fatty acids, peanut oil fatty acids, soybean oil fatty acids, canola oil fatty acids (i.e. fatty acids derived from low erucic acid rapeseed oil), sunflower seed oil fatty acids, sesame seed oil fatty acids, safflower oil fatty acids, palm kernel oil fatty acids, and coconut oil fatty acids. The fatty acids can be saturated or unsaturated, including positional or geometrical isomers, e.g., cis- or trans-isomers, and can be the same for all ester groups, or, more typically, are mixtures of different fatty acids.

The polyol fatty acid polyesters that are liquid have minimal or no solids at a temperature of 98.6° F. (37° C.), i.e., body temperatures. These liquid polyol polyesters typically contain fatty acid ester groups having a high proportion of $C_{12}$ or lower fatty acid groups or else a high proportion of $C_{18}$ or higher unsaturated fatty acid groups. In the case of those liquid polyol polyesters having high proportions of unsaturated $C_{18}$ or higher fatty acid groups, at least about half of the fatty acids incorporated into the polyester molecule are typically unsaturated. Preferred unsaturated fatty acids in such liquid polyol polyesters are oleic acid, linoleic acid, and mixtures thereof. The following are nonlimiting examples of specific liquid polyol fatty acid polyesters suitable for use in the present invention: sucrose tetraoleate, sucrose pentaoleate, sucrose hexaoleate, sucrose heptaoleate, sucrose octaoleate, sucrose hepta- and octaesters of unsaturated soybean oil fatty acids, canola oil fatty acids, cottonseed oil fatty acids, corn oil fatty acids, peanut oil fatty acids, palm kernel oil fatty acids, or coconut oil fatty acids, glucose tetraoleate, the glucose tetraesters of coconut oil or unsaturated soybean oil fatty acids, the mannose tetraesters of mixed soybean oil fatty acids, the galactose tetraesters of oleic acid, the arabinose tetraesters of linoleic acid, xylose tetralinoleate, galactose pentaoleate, sorbitol tetraoleate, the sorbitol hexaesters of unsaturated soybean oil fatty acids, xylitol pentaoleate, and mixtures thereof.

The liquid polyol fatty acid polyesters suitable for use herein can be prepared by a variety of methods known to those skilled in the art. These methods include: transesterification of the polyol (i.e. sugar or sugar alcohol) with methyl, ethyl or glycerol fatty acid esters using a variety of catalysts; acylation of the polyol with a fatty acid chloride; acylation of the polyol with a fatty acid anhydride; and acylation of the polyol with a fatty acid, per se. See, for example, U.S. Pat. Nos. 2,831,854, 3,600,186, 3,963,699, 4,517,360 and 4,518,772, all of which are incorporated by reference, which disclose suitable methods for preparing polyol fatty acid polyesters.

Specific, but nonlimiting, examples of the preparation of liquid polyol fatty acid polyesters suitable for use in the practice of the present invention are as follows.

Erythritol tetraoleate: Erythritol and a five-fold molar excess of methyl oleate are heated at 180° C. under vacuum, with agitation, in the presence of sodium methoxide catalyst over two reaction periods of several hours each. The reaction product (predominately erythritol tetraoleate) is refined in petroleum ether and crystallized three times from several volumes of acetone at 1° C.

Xylitol pentaoleate: Xylitol and a five-fold molar excess of methyl oleate in dimethylacetamide (DMAC) solution are heated at 180° C. for five hours in the presence of sodium methoxide catalyst, under vacuum. During this time the DMAC is removed by distillation. The product (predominately xylitol pentaoleate) is refined in petroleum ether solution and, after being freed of petroleum ether, is separated as a liquid layer four times from acetone at about 1° C. and twice from alcohol at about 10° C.

Sorbitol hexaoleate is prepared by essentially the same procedure used to prepare xylitol pentaoleate except that sorbitol is substituted for xylitol.

Sucrose octaoleate is prepared by substantially the same procedure as that used to prepare erythritol tetraoleate except that sucrose is substituted for erythritol.

Sucrose hepta- and octaesters of soybean oil fatty acids: Soybean oil is partially hydrogenated to an iodine value of 107 and then converted to the respective methyl esters. These methyl esters are then reacted with sucrose in the presence of a potassium carbonate catalyst and the potassium soap of the soybean oil fatty acids.

Sucrose hepta- and octaesters of canola oil fatty acids: Canola oil is partially hydrogenated to an iodine value of 90 and then converted to the respective methyl esters. These methyl esters are then reacted with sucrose at about 135° C. in the presence of a potassium carbonate catalyst and the potassium soap of the canola oil fatty acids. See Example 1 of U.S. Pat. No. 4,517,360 to Volpenhein, issued May 14, 1985.

Sucrose hepta- and octaesters of palm kernel oil fatty acids: Palm kernel oil (hydrogenated to an iodine value of about 4) is converted to the respective methyl esters. These methyl esters are then reacted with sucrose at about 135° C. in the presence of a potassium carbonate catalyst and the potassium soap of the palm kernel oil fatty acids. See Example 1 of U.S. Pat. No. 4,517,360 to Volpenhein, issued May 14, 1985.

The solid polyol fatty acid polyesters useful in the nondigestible fat component of the present invention are solid at temperatures of about 37° C. and higher, and preferably are solid at temperatures of about 50° C. and higher, and most preferably at temperatures of about 60° C. or higher. (Melting points reported herein are measured by Differential Scanning Calorimetry (DSC)). These solid polyol polyesters have the ability to bind high levels of edible liquid nondigestible oils, such as liquid polyol polyesters previously described. This high capacity to bind liquid nondigestible oils enables the solid polyol polyesters to control or prevent the passive oil loss problem associated with the ingestion of such liquid oils.

The solid polyol fatty acid polyesters useful in the present invention comprise a polyol having at least 4 (preferably from 4 to 11, more preferably from 4 to 8, most preferably 6 to 8) hydroxyl groups which have been esterified with certain mixed fatty acid ester groups. Suitable polyols include sugars, sugar alcohols, alkyl glycosides, pentaerythritol, polyglycerols such as diglycerol and triglycerol and polyvinyl alcohols. Preferred solid polyol fatty acid polyesters are selected from solid sugar fatty acid polyesters, solid sugar alcohol fatty acid polyesters and mixtures thereof. With regard to the solid polyol polyesters, suitable sugars and sugar alcohols include the monosaccharides, disaccharides, and trisaccharides, as well as the respective alcohol reduction products of these sugars. Preferred sugars or sugar alcohols contain 4 to 8 (most preferably 6 to 8) hydroxyl groups prior to esterification. Examples of suitable monosaccharides, disaccharides and trisaccharides include those previously defined for the liquid polyol polyesters, with sucrose being a particularly preferred polyol.

The solid polyol fatty acid polyesters used in the present invention contain ester groups which consist essentially of long chain saturated fatty acid radicals. Suitable saturated fatty acid radicals contain at least 14, preferably from 14 to 26, most preferably from 16 to 22, carbon atoms. The long chain saturated fatty acid radicals can be used singly or in mixtures with each other. In addition, straight chain (i.e. normal) fatty acid radicals are typical for the long chain saturated fatty acid radicals The average degree of esterification of these solid polyol fatty acid polyesters with these long chain saturated fatty acid radicals is such that at least 4 of the hydroxyl groups of the polyol are esterified. In the case of solid sucrose polyesters, from about 7 to 8 of the hydroxyl groups of the polyol preferably are esterified. Typically, substantially all (e.g., at least about 85%, preferably at least about 95%) of the hydroxyl groups of the polyol are esterified.

Examples of suitable long chain saturated fatty acid radicals are tetradecanoate (myristate), hexadecanoate (palmitate), octadecanoate (stearate), eicosanoate (arachidate), docosanoate (behenate), tetracosanate (lignocerate), and hexacosanoate (cerotate). Mixed fatty acid radicals from completely or substantially completely hydrogenated vegetable oils which contain substantial amounts of the desired long chain saturated fatty acids can be used as sources of fatty acid radicals in preparing the solid polyol polyesters useful in the present invention. The mixed fatty acids from such oils should preferably contain at least about 30% (more preferably at least about 50%, most preferably at least about 80%) of the desired long chain saturated fatty acids. Suitable source oils include completely or substantially completely hydrogenated soybean oil, cottonseed oil, palm oil, peanut oil, corn oil, safflower oil, sunflower oil, sesame oil, low erucic acid rapeseed oil (i.e. canola oil), and high erucic acid rapeseed oil. These oils are typically hydrogenated to an Iodine Value of about 12 or less, and preferably to an Iodine Value of about 8 or less.

Examples of solid polyol fatty acid polyesters useful in the present invention include sucrose octabehenate, sucrose octastearate, sucrose octapalmitate, sucrose heptastearate, xylitol pentastearate, galactose pentapalmitate, and the sucrose hepta- and octaesters of soybean oil fatty acids that have been hydrogenated to an Iodine Value of about 8 or less.

The solid polyol fatty acid polyesters of the present invention can be made according to prior known methods for preparing polyol polyesters. Since the sucrose polyesters are the preferred solid polyol polyesters for use in the present invention, such preparation will be exemplified primarily by these materials. One such method of preparation is by reacting the acid chlorides or acid anhydrides of the respective fatty acids with sucrose. Another method for preparing these solid polyol polyesters is by the process of reacting the methyl esters of the respective fatty acids with sucrose in the presence of a fatty acid soap and a basic catalyst such as potassium carbonate. See, for example, U.S. Pat. No. 3,963,699 to Rizzi et al, issued Jun. 15, 1976, U.S. Pat. No. 4,518,772 to Volpenhein, issued May 21, 1985, and U.S. Pat. No. 4,517,360 to Volpenhein, issued May 14, 1985, all of which are incorporated by reference.

Specific, but nonlimiting, examples of the preparation of solid polyol fatty acid polyesters suitable for use in the practice of the present invention are as follows:

Sucrose octabehenate: Behenic acid is converted to the respective methyl ester and then reacted with sucrose at about 135° C. in the presence of a potassium carbonate catalyst and the potassium soap of behenic acid. See Example 1 of U.S. Pat. No. 4,517,360 to Volpenhein, issued May 14, 1985.

Sucrose hepta- and octaesters of hydrogenated soybean oil fatty acids: Soybean oil (hydrogenated to an iodine value of about 8 or less) is converted to the respective methyl esters. These methyl esters are then reacted with sucrose at about 135° C. in the presence of a potassium carbonate catalyst and the potassium soap of the hydrogenated soybean oil fatty acids. See Example 1 of U.S. Pat. No. 4,517,360 to Volpenhein, issued May 14, 1985.

In addition to the nondigestible fat component, the fat compositions of the present invention can optionally include a digestible triglyceride fat or oil. Generally, fat compositions of the present invention can comprise from 0 to about 90% of such triglyceride fats or oils. Preferably, the fat compositions of the present invention comprise from 0 to about 60%, and most preferably from about 30 to about 60%, of such triglyceride fats or oils. Because of the potential caloric impact of these triglyceride fats and oils, it is desirable to minimize the level at which they are included in the fat compositions of the present invention.

As used herein, the term "triglyceride oil" refers to those triglyceride compositions which are fluid or liquid above about 25° C. Although not a requirement, the triglyceride oils useful in the present invention can include those which are fluid or liquid below 25° C. These triglyceride oils consist primarily of triglyceride materials, but can also include residual levels of other components such as mono- and diglycerides. To remain fluid or liquid at temperatures below 25° C., the triglyceride oil contains a minimal amount of glycerides having melting points higher than about 25° C. so as to limit the solids increase when the triglyceride oil is cooled. It is desirable that the triglyceride oil be chemically stable and resistant to oxidation.

Suitable triglyceride oils can be derived from naturally occurring liquid vegetable oils such as cottonseed oil, soybean oil, safflower oil, corn oil, olive oil, coconut oil, palm kernel oil, peanut oil, rapeseed oil, canola oil (i.e., rapeseed oil low in erucic acid), sesame seed oil, sunflower seed oil, and mixtures thereof. Also suitable are liquid oil fractions obtained from palm oil, lard and tallow by, for example, graining or directed interesterification, followed by separation of the oils. Oils predominating in glycerides of unsaturated acids can need some hydrogenation to maintain flavor, but care should be taken not to greatly increase the amount of glycerides melting above 25° C. When oils are selected which have a larger amount of solids melting between 25° and 40° C. than are desirable, it can be necessary to separate out the solids. For example, refined and slightly hydrogenated soybean oil is suitable, as well as refined cottonseed oil.

As used herein, the term "triglyceride fat" refers to those triglyceride compositions which are solid or plastic above about 25° C. These solid or plastic fats can be derived from plants or animals or can be edible synthetic fats or oils. For example, animal fats such as lard, tallow, oleo oil, oleo stock, oleo stearin and the like which are solid at room temperature can be utilized. Also, triglyceride oils, e.g. unsaturated vegetable oils, can be converted into plastic fats by partial hydrogenation of the unsaturated double bonds of fatty acid constituents of the oil followed by conventional chilling and crystallization techniques or by proper mixture with sufficient triglycerides which are solid at room temperature to form a rigid interlocking crystalline structure which interferes with the free-flowing properties of the liquid oil. See U.S. Pat. No. 3,355,302 to Purves et al, issued Nov. 28, 1967, and U.S. Pat. No. 3,867,556 to Darragh et al, issued Feb. 18, 1975 (herein incorporated by reference), for further examples of solid or plastic fats. Because the solid or plastic fats add an appreciable level of solids to the fat compositions of the present invention, their inclusion can cause adverse effects on the organoleptic properties, in particular waxiness and flavor display, of potato chips or other low moisture foods containing these compositions.

Triglyceride fats or oils useful in the fat compositions of the present invention can also include certain triglycerides in which one, two or three of the OH groups of the glycerol molecule have been substituted with acetyl, propionyl, butyryl, caproyl, caprylyl, or capryl radicals, and the remaining OH groups of the glycerol molecule (if any) have been substituted with acyl radicals of saturated or unsaturated fatty acids having from 12 to 24 carbon atoms.

Various other ingredients typically included in fat products can also be included in fat compositions of the present invention. These other ingredients include stabilizers to help protect against oxidative deterioration at high temperatures. Silicone oils, particularly methyl and ethyl silicone oils, are useful for this purpose. Methyl silicones have also proven effective in reducing the rate of oil polymerization during frying. Other additives typically included in fat products such as minor amounts of optional flavorings, emulsifiers, anti-spattering agents, anti-sticking agents, antioxidants or the like can also be present.

The fat compositions of the present invention can also be fortified with vitamins and minerals, particularly the fat-soluble vitamins. The fat-soluble vitamins include vitamin A, vitamin D, and vitamin E. See U.S. Pat. No. 4,034,083 to Mattson (herein incorporated by reference) which discloses fat-soluble vitamins useful in fortifying polyol fatty acid polyesters.

The fat compositions of the present invention can also include noncaloric or reduced calorie sweetners alone or in combination with bulking agents. These noncaloric or reduced calorie sweeteners include, but are not limited to, aspartame, saccharin, alitame, thaumatin, dihydrochalcones, acesulfame, and cyclamates.

Bulking or bodying agents which can be useful in the fat compositions include partially or wholly nondigestible carbohydrates, for example, polydextrose and cellulose or cellulose derivatives, such as carboxymethylcellulose, carboxyethylcellulose, hydroxypropylcellulose, methylcellulose, hydroxypropyl methylcellulose, and microcrystalline cellulose. Other suitable bulking agents include gums (hydrocolloids), starches, dextrins, fermented whey, tofu, maltodextrins, polyols, including sugar alcohols, e.g., sorbitol and mannitol, and carbohydrates, e.g., lactose.

The fat compositions of the present invention can include dietary fibers. By "dietary fiber" is meant complex carbohydrates resistant to digestion by mammalian enzymes, such as the carbohydrates found in plant cell walls and seaweed, and those produced by microbial fermentation. Examples of these complex carbohydrates are brans, celluloses, hemicelluloses, pectins, gums and mucilages, seaweed extract, and biosynthetic gums. Sources of the cellulosic fiber include vegetables, fruits, seeds, cereals, and man-made fibers (for example, by bacterial synthesis). Commercial fibers such as purified plant cellulose, or cellulose flour, can also be used. Naturally occurring fibers can be used, such as psyllium and fibers from whole citrus peel, citrus albedo, sugar beets, citrus pulp and vesicle solids, apples, apricots, and watermelon rinds.

These dietary fibers can be in a crude or purified form. The dietary fiber used can be of a single type (e.g., cellulose), a composite dietary fiber (e.g., citrus albedo fiber containing cellulose and pectin), or some combination of fibers (e.g., cellulose and a gum). The fibers can be processed by methods known to the art.

C. Foods Containing Fat Compositions

The present invention also relates to potato chips and other low moisture foods containing the fat compositions described in part B of this application. As used herein, the term "low moisture food" refers to a food having nonfat ingredients (e.g., carbohydrates, protein, etc.) and having an end product moisture content typically of about 10% or less, preferably about 5% or less, more preferably about 3% or less, most preferably about 2% or less, i.e. is typically crisp. This end product moisture content can be achieved before or after treatment with the fat composition. For example, in the case of potato chips, this moisture content would be achieved as a result of frying in the fat composition. The fat compositions of the present invention can be applied to the exterior surface of these low moisture foods (i.e., fat-coated foods), incorporated into the interior thereof, such as in the case of mixing with the other food ingredients, or incorporated into the food, followed by application to the exterior surface thereof.

The present invention particularly relates to potato chips and other low moisture foods that are coated with these fat compositions. As used herein, the term "fat-coated foods" refers to foods prepared by applying the fat compositions of the present invention to all or a portion of the surface thereof. These fat compositions can be applied by a variety of means including immersing, dipping, soaking, spraying, blowing, pouring, pan coating (e.g., in a revolving pan), tumble coating, brushing, applying with a roller, rolling around in a container of fat composition, falling film methods, enrobing and curtain coating. The fat composition can be heated during application to the food, such as in the case of frying. If desired, the fat compositions of the present invention can be applied to the surface of the food, followed by heating, such as baking in the case of baked foods. The fat composition can also be applied to the surface of a food which already contains fat. Once applied to the surface, the fat composition is typically absorbed into the interior of the food, such as in the case of potato chips, corn chips and tortilla chips.

The fat compositions of the present invention are particularly useful in the preparation of fried foods such as potato chips. The method for frying potato chips and other foods comprises immersing these foods in a fat composition of the present invention that is heated to the appropriate temperature, for an appropriate period of time. The particular temperatures and times for frying will depend on the particular food that is involved, the moisture content desired in the resulting fried food, the product appearance desired, the texture desired, and the amount of fat absorption desired. In the case of potato chips, the potato slices or fabricated potato pieces are immersed in a fat composition heated to a temperature of from about 300° to about 400° F. (from about 148.9° to about 204.4° C.), preferably from about 340° to about 400° F. (from about 171.1° to about 204.4° C.), most preferably from about 350° to about 380° F. (from about 176.7° to about 193.3° C.), for a period of time sufficient to achieve a moisture content of about 3% or less in the potato chips. In the case of corn chips or tortilla chips, the chips are immersed in a fat composition heated to a temperature of from about 350° to about 420° F. (from about 176.7° to about 215.6° C.), preferably from about 370° to about 410° F. (from about 187.8° to about 210° C.), most preferably from about 370° to about 390° F. (from about 187.7° to about 198.9° C.), for a period of time sufficient to achieve a moisture content of about 3% or less in the corn/tortilla chips. Agitation of the fat composition by mechanical or fluid means is desirable to provide fried foods having a more consistent doneness throughout.

The fat compositions of the present invention are particularly useful in the preparation of potato chips from either potato slices or fabricated potato pieces that have been fried in these compositions. As used herein, the term "potato slices" refers to slices which have been cut from whole potatoes. As used herein, the term "fabricated potato pieces" refers to potato pieces obtained from a dough sheet formed from mashed potatoes or reconstituted mashed potatoes (i.e. dried mashed potatoes in the form of flakes and/or granules to which water has been added). In addition to potato chips, the fat compositions of the present invention are useful in the preparation of other fried or baked salted snacks such as corn chips, tortilla chips, potato sticks, popcorn, nuts, sweet snacks, corn curls and corn puffs, pellet snacks, half products, and other extruded snacks based on corn or other cereal grains such as wheat, rice, and the like. Other foods for which the fat compositions of the present invention can be useful include crackers and fruit slices.

D. Analytical Methods

1. Thixotropic Area of Fat Composition a. Tempering of Sample

A 5 to 10 gram sample of the fat composition is heated to about 190° F. (87.8° C.) to melt it. The melted sample is poured into an aluminum weighing dish and then heated to a temperature of at least about 240° F. (115.6° C.) using a hotplate. The heated sample is then placed on a surface cooled by a refrigerated bath set at 40° F. (4.4° C.). The sample is then cooled gradually, with agitation, over a period of 3 minutes to 85° F. (29.4° C.), using a thermocouple and calibrated chart recorder to monitor the rate of temperature decrease. The cooled sample is then tempered for 1 week at 70° F. (21.1° C.).

b. Measurement

The thixotropic area of the fat compositions of the present invention is determined by a rheological measurement of the tempered sample while being subjected to different rates of shear. A Contraves Rheomat 115 rheometer is used with a cone and plate orientation. The sample of the fat composition is deposited on the plate of the rheometer after the temperature of the plate surface has equilibrated to 92° F. (33.3° C.), using a temperature-controlled recirculating bath. The torque motor and cone head are then brought down slowly onto the sample, making sure that the sample spreads to completely cover the cone surface (a slight excess being acceptable). The rheometer then ramps up from a shear rate of 0 sec.$^{-1}$ to a shear rate of 800 sec.$^{-1}$ in 2 minutes and then ramps back down to a shear rate of 0 sec.$^{-1}$ in 2 minutes. A variety of rheological measurements can be calculated from a plot of the shear rate versus the shear stress. In the case of thixotropic area, the area encompassed by the hysteresis "loop" on the plot is calculated.

2. Fatty Acid Composition of Polyol Polyesters

The fatty acid composition (FAC) of the polyol polyesters is determined by gas chromatography, using a Hewlett-Packard Model S712A gas chromatograph equipped with a thermal conductivity detector and a Hewlett-Packard Model 7671A automatic sampler. The chromatographic method used is described in *Official Methods and Recommended Practices of the American Oil Chemists Society*, 3rd Ed., 1984, Procedure 1-C$_e$62.

3. Ester Distribution of Sucrose Polyesters

The relative distribution of the individual octa-, hepta-, hexa- and penta- esters, as well as collectively the tetra- through mono- esters, of the sucrose polyesters can be determined using normal-phase high performance liquid chromatography (HPLC). A silica gel-packed column is used in this method to separate the polyester sample into the respective ester groupings noted above. Hexane and methyl-t-butyl ether are used as the mobile phase solvents. The ester groupings are quantitated using a mass detector (i.e. an evaporative light-scattering detector). The detector response is measured and then normalized to 100%. The individual ester groups are expressed as a relative percentage.

4. Slope of Solid Fat Content (SFC) Profile of Nondigestible Fat

Before determining the SFC values, a sample of the nondigestible fat is heated to a temperature of 140° F. (60° C.) or higher for at least 30 minutes or until the sample is completely melted. The melted sample is then tempered as follows: at 80° F. (26.7° C.) for 15 minutes; at 32° F. (0° C.) for 15 minutes; at 80° F. (26.7° C.) for 30 minutes; at 32° F. (0° C.) for 15 minutes. After tempering, the SFC values of the sample at temperatures of 50° F. (10° C.), 70° F. (21.1° C.), 80° F. (26.7° C.), 92° F. (33.3° C.), and 98.6° F. (37° C.) are determined by pulsed nuclear magnetic resonance (PNMR) after equilibration for 30 minutes at each temperature. The slope of the SFC profile is calculated by subtracting the SFC value at 70° F. (21.1° C.) from the SFC value at 98.6° F. (37° C.) and then dividing by 28.6. The method for determining SFC values by PNMR is described in *J.*

Amer. Oil Chem. Scc., Vol. 55 (1978), pp. 328-31 (herein incorporated by reference, and A.O.C.A. Official Method Cd. 16-81, *Official Methods and Recommended Practices of The American Oil Chemists Society*, 3rd. Ed., 1987, (herein incorporated by reference).

5. Fat Content of Food

The fat content of a food can be determined by heating a sample of the food at 122° F. (50° C.) for at least 20 minutes and then measuring the fat level at the indicated temperature by pulsed nuclear magnetic resonance (PNMR). See references cited above for determining fat content by PNMR.

6. Complete Melting Point of Solid Polyol Polyesters by Differential Scanning Calorimetry (DSC)

The complete melting point of the solid polyol polyesters can be determined by DSC as follows:

Equipment

Perkin-Elmer 7 Series Thermal Analysis System, Model DSC7, manufactured by Perkin-Elmer, Norwalk, Conn.

Procedure

1. Sample of solid polyol polyesters is heated to at least 10° C. above the complete melt point and mixed thoroughly.
2. 10±2 mg of sample is weighed into sample pan.
3. A scan is performed from about 10° C. above the complete melt point to −60° C. at 5° C. per minute.
4. The temperature of the sample is maintained at −60° C. for 3 minutes and scanned from −60° C. to the original starting temperature at 5° C. per minute (i.e., about 10° C. above the complete melt point.)
5. the complete melt point is the temperature at the intersection of the base line (i.e. specific heat line) with the line tangent to the trailing edge of the endothermic peak.

E. Specific Illustrations of Potato Chips Fried in Fat Compositions of the Present Invention The following are specific illustrations of potato chips fried in fat compositions of the present invention:

1. Preparation of Fat Compositions

The following solid sucrose polyesters (Solid SPEs) are used:

| FAC | |
|---|---|
| $C_{12:0}$ | — |
| $C_{14:0}$ | 0.2% |
| $C_{16:0}$ | 12.6 |
| $C_{18:0}$ | 84.8 |
| $C_{18:1}$ | 1.7 |
| $C_{18:2}$ | 0.2 |
| $C_{18:3}$ | — |
| $C_{20:0}$ | 0.3 |
| $C_{22:0}$ | — |
| $C_{24:0}$ | — |
| Esters | |
| Octa | 92.8% |
| Hepta | 7.2 |
| Hexa | <0.1 |
| Penta | <0.1 |
| Lower | <0.1 |

[1] Obtained by esterifying sucrose with methyl esters of soybean oil fatty acids hardened to an Iodine Value of about 2 or less.

The following liquid sucrose polyester (liquid SPEs) is used:

| Esters | Liquid SPE[2] |
|---|---|
| Octa | 91.9% |
| Hepta | 8.1 |
| Hexa | <0.1 |
| Penta | <0.1 |
| Lower | <0.1 |

The Solid SPE is added to the heated Liquid SPE, and refined, bleached cottonseed oil (CSO), melted and then blended together to provide the following fat compositions:

| Fat Composition | Component | % |
|---|---|---|
| A | Solid SPE | 24 |
| | Liquid SPE | 35 |
| | CSO | 40 |
| B | Solid SPE | 12 |
| | Liquid SPE | 48 |
| | CSO | 40 | b. Preparation of Potato Chips

Norchip potatoes are used which have been sliced to a thickness of about 0.051 inches (0.13 cm). The sliced potatoes are fried in a 5 pound batch fryer at a temperature of 365° F. (185° C.) for 3 minutes, 5 seconds. Chips are fried in each of fat compositions A and B.

The thixotropic area of each fat composition, as well as the average fat contents of the potato chips fried in each composition, are shown in the following table:

| Fat Composition | Thixotropic Area (Pa/S) | Fat Content (%) |
|---|---|---|
| A | 45664 | 44.0 |
| B | 21568 | 44.3 |

What is claimed is:

1. A low moisture food having nonfat ingredients and a moisture content of about 10% or less and further comprising a fat composition having a thixotropic area of about 200,000 pascals/second or less at 33.3° C., which fat composition comprises:
   A. from about 10 to 100% of a nondigestible fat component having a Solid Fat Content profile slope between 37° C. and 21.1° C. of from 0 to about −0.3, which nondigestible fat component comprises:
   (1) from about 60 to about 90% of a liquid nondigestible oil having a complete melting point below about 37° C.; and
   (2) from about 10 to about 40% solid polyol fatty acid polyesters having a complete melting point above about 37° C., wherein said polyol has at least 4 hydroxyl groups, wherein the ester groups consist essentially of $C_{14}$ or higher saturated fatty acid radicals, and wherein at least 4 of said hydroxyl groups are esterified; and
   B. from 0 to about 90% of a digestible triglyceride fat or oil.

2. The food product of claim 1 wherein said liquid nondigestible oil is a liquid sucrose fatty acid polyester and said solid polyol polyesters are sucrose polyesters having from 7 to 8 hydroxyl groups esterified.

3. The food product of claim 2 wherein said nondigestible fat component has a Solid Fat Content profile slope of from 0 to about −0.1 and comprises from about 75% to 85% liquid sucrose polyester and from about 15% to about 25% solid sucrose polyesters.

4. The food product of claim 3 wherein the ester groups forming said solid sucrose polyesters consist essentially of saturated fatty acid radicals having from 16 to 22 carbon atoms and are derived from a completely or substantially completely hydrogenated vegetable oil.

5. The food product of claim 4 wherein said ester groups consist essentially of soybean oil fatty acid radicals hydrogenated to an Iodine Value of about 8 or less.

6. The food product of claim 3 wherein said fat composition has a thixotropic area of about 60,000 pascals/second or less at 33.3° C. and comprises from about 40% to 70% nondigestible fat component and from about 30% to 60% digestible triglyceride fat or oil.

7. The food product of claim 6 which comprises potato chips fried in said fat composition to a moisture content of about 5% or less, wherein said fat composition has a thixotropic area of about 20,000 pascals/second or less at 33.3° C.

8. A method for preparing a low moisture fat-coated food having a moisture content of about 10% or less, which method comprises the step of applying to the surface of the food a fat composition having a thixotropic area of about 200,000 pascals/second or less at 33.3° C., which fat composition comprises:
A. from about 10 to 100% of a nondigestible fat component having a Solid Fat Content profile slope between 37° C. and of 21.1° C. from 0 to about −0.3, which nondigestible fat component comprises:
(1) from about 60 to about 90% of a liquid nondigestible oil having a complete melting point below about 37° C.; and
(2) from about 10 to about 40% solid polyol fatty acid polyesters having a complete melting point above about 37° C., wherein said polyol has at least 4 hydroxyl groups, wherein the ester groups consist essentially of $C_{14}$ or higher saturated fatty acid radicals, and wherein at least 4 of the hydroxyl groups are esterified; and
B. from 0 to about 90% of a digestible triglyceride fat or oil.

9. A method according to claim 8 wherein said liquid nondigestible oil is a liquid sucrose fatty acid polyester and said solid polyol polyesters are sucrose polyesters having from 7 to 8 hydroxyl groups esterified.

10. A method according to claim 9 wherein said nondigestible fat component has a Solid Fat Content profile slope of from 0 to about −0.1 and comprises from about 75% to 85% liquid sucrose polyester and from about 15% to about 25% solid sucrose polyesters.

11. A method according to claim 10, wherein the ester groups forming said solid sucrose polyesters consist essentially of saturated fatty acid radicals having form 16 to 22 carbon atoms and are derived from a completely or substantially completely hydrogenated vegetable oil.

12. A method according to claim 11 wherein said ester groups consist essentially of soybean oil fatty acid radicals hydrogenated to an Iodine Value of about 8 or less.

13. A method according to claim 12 wherein said fat composition has a thixotropic area of about 60,000 pascals/second or less at 33.3° C. and comprises from about 40% to 70% nondigestible fat component and from about 30% to 60% digestible triglyceride fat or oil.

14. A method according to claim 13 wherein the food prepared comprises potato chips and wherein said fat composition is applied by immersing sliced potatoes or fabricated potato pieces in said fat composition which has a thixotropic area of 20,000 pascals/second or less at 33.3° C. and which is heated to a temperature of from about 148.9° C. to 204.4° C., said immersing being carried out for a period of time sufficient to achieve a moisture content of about 5% or less in the resulting potato chips.

15. A fat composition having a thixotropic area of 200,000 pascals/second or less at 33.3° C., which fat composition comprises:
I. form about 10 to 100% of a nondigestible fat component having a Solid Fat Content profile slope between 37° C. and 21.2° C. of from 0 to about −0.3, which nondigestible fat component comprises:
(A) from about 60 to about 90% of a liquid nondigestible oil having a complete melting point below about 37° C.; and
(B) from about 10 to about 40% solid polyol fatty acid polyesters having a complete melting point above about 37° C., wherein said polyol has at least 4 hydroxyl groups, wherein the ester groups consist essentially of $C_{14}$ or higher saturated fatty acid radicals and wherein at least 4 of said hydroxyl groups are esterified; and
II. from 0 to about 90% of a digestible triglyceride fat or oil.

16. A composition according to claim 15 wherein said liquid nondigestible oil is a liquid sucrose fatty acid polyester and said solid polyol polyesters are sucrose polyesters having form 7 to 8 hydroxyl groups esterified.

17. A composition according to claim 16 wherein said nondigestible fat component has a Solid Fat Content profile slope of from 0 to about −0.1 and comprises form about 75% to 85% liquid sucrose polyester and from about 15% to about 25% solid sucrose polyesters.

18. A composition according to claim 17 wherein the ester groups forming said solid sucrose polyesters consist essentially of saturated fatty acid radicals having from 16 to 22 carbon atoms and are derived from a completely or substantially completely hydrogenated vegetable oil.

19. A composition according to claim 18 wherein said ester groups consist essentially of soybean oil fatty acid radicals hydrogenated to an Iodine Value of about 8 or less.

20. A composition according to claim 19 wherein said fat composition has a thixotropic area of about 60,000 pascals/second or less at 33.3° C. and comprises from about 40% to 70% nondigestible fat component and from about 30% to 60% digestible triglyceride fat or oil.

21. The composition of claim 15 wherein said nondigestible fat component is formed by blending said liquid nondigestible oil with said solid polyol polyesters.

* * * * *